(12) United States Patent
Park et al.

(10) Patent No.: US 12,285,998 B2
(45) Date of Patent: Apr. 29, 2025

(54) VEHICLE PROVIDED WITH PERFUME DIFFUSER AND METHOD OF CONTROLLING THEREOF

(71) Applicants: HYUNDAI MOTOR COMPANY, Seoul (KR); KIA CORPORATION, Seoul (KR)

(72) Inventors: Intaek Park, Hwaseong-si (KR); Dong Won Yeon, Daejeon (KR); Myung Jun Kim, Busan (KR); Tae Kun Kim, Ansan-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 712 days.

(21) Appl. No.: 17/544,189

(22) Filed: Dec. 7, 2021

(65) Prior Publication Data

US 2023/0007981 A1 Jan. 12, 2023

(30) Foreign Application Priority Data

Jul. 6, 2021 (KR) .......................... 10-2021-0088183

(51) Int. Cl.
*B60H 3/00* (2006.01)

(52) U.S. Cl.
CPC ..... *B60H 3/0035* (2013.01); *B60H 2003/005* (2013.01); *B60H 2003/0057* (2013.01)

(58) Field of Classification Search
None
See application file for complete search history.

(56) References Cited

FOREIGN PATENT DOCUMENTS

DE 102013222934 A1 * 5/2015 ........... B60H 3/0007

OTHER PUBLICATIONS

Baumann et al. DE102013222934A1—translated document (Year: 2015).*

* cited by examiner

*Primary Examiner* — Jelitza M Perez
(74) *Attorney, Agent, or Firm* — MCDONNELL BOEHNEN HULBERT & BERGHOFF LLP (57) ABSTRACT

A vehicle includes a perfume diffuser including a pair of electrodes, at least one fragrance cartridge including a resistance plate electrically connected to the pair of electrodes, and a controller identifying the types of the fragrance cartridge based on the size of current flowing through the pair of electrodes and the resistance plate.

7 Claims, 7 Drawing Sheets

VEHICLE PROVIDED WITH PERFUME DIFFUSER AND METHOD OF CONTROLLING THEREOF

CROSS-REFERENCE TO RELATED APPLICATION

This application claims priority to and the benefit of Korean Patent Application No. 10-2021-0088183 filed in the Korean Intellectual Property Office on Jul. 6, 2021, the entire contents of which are incorporated herein by reference.

BACKGROUND (a) Field

The present disclosure relates to a vehicle provided with a perfume diffuser and a method of controlling the same. More particularly, the present disclosure relates to a vehicle provided with a perfume diffuser and a method in which controls the perfume diffuser mounted on the vehicle.

(b) Description of the Related Art

Recently, various additional devices have been installed to stimulate emotions of occupant on a vehicle to reduce stress of the occupant of while driving.

For example, a device that generates a specific fragrance (e.g., perfume diffuser) is mounted in the vehicle, and a driver may reduce stress while driving by feeling the fragrance generated by the perfume diffuser.

However, in the conventional art, it was not possible to clearly grasp how much the perfume diffuser mounted on the vehicle was used (or how much is the remaining amount of the perfume diffuser), and what kind of fragrance is being used.

The above information disclosed in this Background section is only for enhancement of understanding of the background of the disclosure, and therefore it may contain information that does not form the prior art that is already known in this country to a person of ordinary skill in the art.

SUMMARY

An exemplary embodiment of the present disclosure provides a vehicle provided with a perfume diffuser and a method of controlling the same that identifies a usage amount of types of the perfume diffuser mounted on the vehicle.

A vehicle according to an exemplary embodiment of the present disclosure may include a perfume diffuser including a pair of electrodes, at least one fragrance cartridge including a resistance plate electrically connected to the pair of electrodes, and a controller identifying the types of the fragrance cartridge based on the size of current flowing through the pair of electrodes and the resistance plate.

The controller may calculate a usage amount of the fragrance cartridge based on an operation intensity of the perfume diffuser and a use time of the perfume diffuser.

A plurality of fragrance cartridges may be provided, the resistance plates provided in each fragrance cartridge may have different resistance with each other.

The controller may apply a predetermined voltage between the perfume diffuser and the pair of electrodes, detect the size of current flowing through the pair of electrodes and the resistance plate, and identify the types of the fragrance cartridge.

The controller may output the type of the fragrance cartridge through a display device.

The controller may output the usage amount of the fragrance cartridge through the display device.

The controller may inform a user to replace the fragrance cartridge through the display device when the usage amount of the fragrance cartridge reaches a predetermined amount.

A method of controlling a vehicle provided with a perfume diffuser according to another exemplary embodiment of the present disclosure may include, by a controller, applying a predetermined voltage to a pair of electrodes provided in the perfume diffuser and a resistance plate provided in a fragrance cartridge mounted on the perfume diffuser, by the controller, detecting the size of current flowing through the pair of electrodes and the resistance plate, by the controller, identifying types of the fragrance cartridge mounted on the perfume diffuser based on the size of current of flowing through the pair of electrodes and the resistance plate, and by the controller, calculating a usage amount of the fragrance cartridge mounted on the perfume diffuser based on a consumption flow rate of a liquid perfume according to an operation intensity of the perfume diffuser set by a user and an use time of the perfume diffuser.

The method according to another exemplary embodiment of the present disclosure may further include, by the controller, displaying the types of the fragrance cartridge through a display device.

The method according to another exemplary embodiment of the present disclosure may further include, informing the user to replace the fragrance cartridge when the usage amount of the fragrance cartridge reaches a predetermined amount.

According to an exemplary embodiment of the present disclosure, it is possible to easily identify the types of the fragrance cartridge 20 mounted on the perfume diffuser 10 of the vehicle through a simple structure, and reduce manufacturing cost of the vehicle by removing additional dedicated controller for controlling the perfume diffuser 10.

BRIEF DESCRIPTION OF THE DRAWINGS

The drawings are provided for reference to explain an illustrative exemplary embodiment of the present disclosure, and the technical spirit of the present disclosure should not be interpreted to be limited to the accompanying drawings.

DETAILED DESCRIPTION OF THE EMBODIMENTS

The present disclosure will be described more fully hereinafter with reference to the accompanying drawings, in which exemplary embodiments of the disclosure are shown. As those skilled in the art would realize, the described embodiments may be modified in various different ways, all without departing from the spirit or scope of the present disclosure.

To clearly describe the present disclosure, parts that are irrelevant to the description are omitted. Like numerals refer to like or similar constituent elements throughout the specification.

The size and the thickness of each component illustrated in the drawings are arbitrarily illustrated in the drawings for better understanding and ease of description, but the present disclosure is not limited to the illustration. In the drawings, the thicknesses of various portions and regions are enlarged for clarity.

Hereinafter, a vehicle provided with a perfume diffuser according to an exemplary embodiment of the present disclosure will be described in detail with reference to accompanying drawings.

Figure 1:
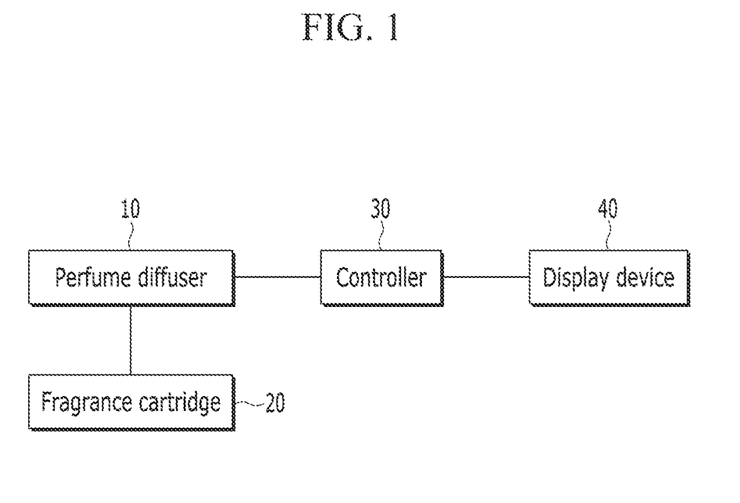
FIG. 1 is a block diagram illustrating a vehicle provided with a perfume diffuser according to an exemplary embodiment of the present disclosure.

FIG. 1 is a block diagram illustrating a vehicle provided with a perfume diffuser according to an exemplary embodiment of the present disclosure. In addition, FIG. 2 is a cross-sectional view illustrating a perfume diffuser and a fragrance cartridge according to an exemplary embodiment of the present disclosure.

Figure 2:
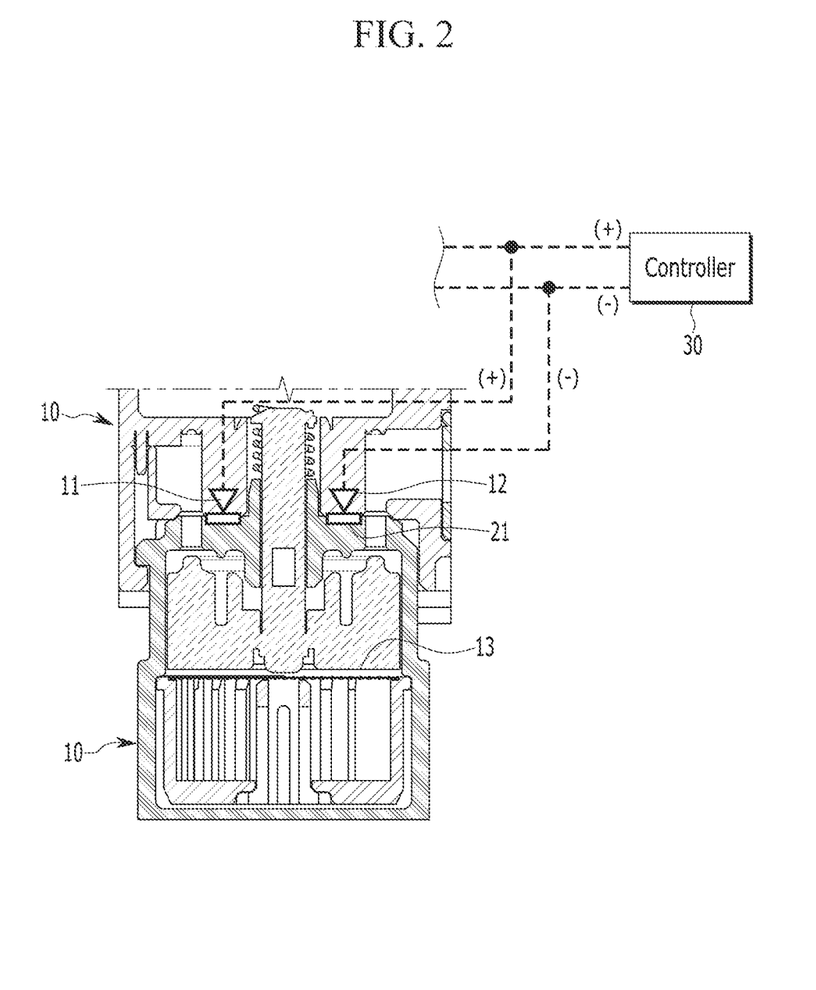
FIG. 2 is a cross-sectional view illustrating a perfume diffuser and a fragrance cartridge according to an exemplary embodiment of the present disclosure.

As shown in FIG. 1 and FIG. 2, a vehicle according to an exemplary embodiment of the present disclosure may include a perfume diffuser 10, a fragrance cartridge 20 mounted in the perfume diffuser 10 and storing liquid perfume, and a controller 30 identifying types of the fragrance cartridge 20 and calculating a usage amount of the fragrance cartridge 20.

The perfume diffuser 10 is mounted inside the vehicle and vaporizes the liquid perfume stored in the fragrance cartridge 20. The vaporized perfume by the perfume diffuser 10 is dispersed inside the vehicle so that the occupant may feel the scent.

Figure 3:
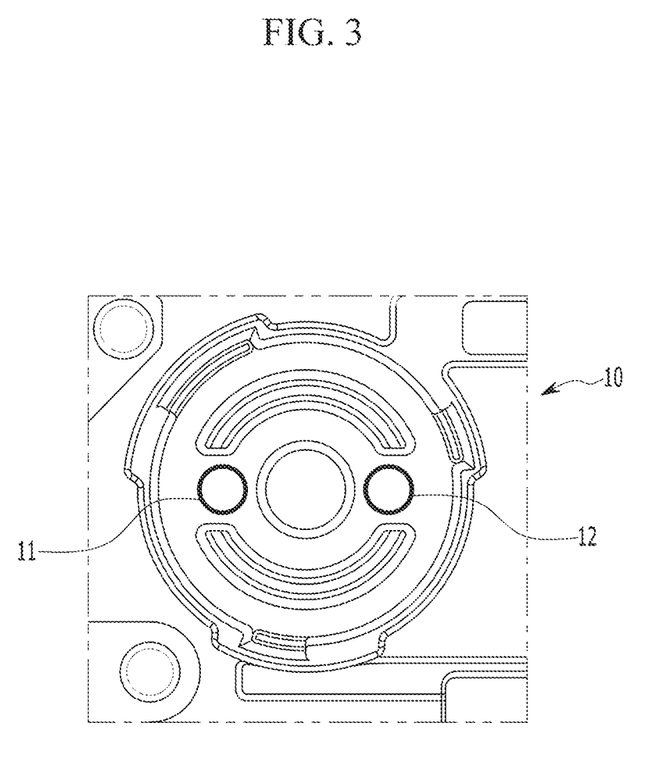
FIG. 3 is a drawing illustrating a lower part of a perfume diffuser according to an exemplary embodiment of the present disclosure.

A pair of electrodes 11 and 12 electrically connected to the fragrance cartridge 20 are installed under the perfume diffuser 10. The pair of electrodes 11 and 12 may include a positive electrode 1I and a negative electrode 12, and the pair of electrodes 11 and 12 are electrically connected to the controller 30 (refer to FIG. 3).

The fragrance cartridge 20 is mounted on the perfume diffuser 10 and stores liquid perfume. When the fragrance cartridge 20 is mounted on the perfume diffuser 10, a vibration plate 13 of the perfume diffuser 10 is inserted into the fragrance cartridge 20 and immersed in the liquid perfume. When current is applied to the vibration plate 13, the liquid perfume is vaporized by ultrasonic wave vibration, and the vaporized perfume is spread inside the vehicle.

A resistance plate 21 is positioned in the fragrance cartridge 20, and the resistance plate 21 is electrically connected to the pair of electrodes 11 and 12 of the perfume diffuser 10, when the fragrance cartridge 20 is mounted on the perfume diffuser 10. At this time, one end of the resistance plate 21 may be electrically connected to the positive electrode 11, and the other end of the resistance plate 21 may be electrically connected to the negative electrode 12.

At least one fragrance cartridge 20 may be mounted on the perfume diffuser 10. In some embodiments, a plurality of fragrance cartridges 20 may be mounted on the perfume diffuser 10, if necessary. The resistance plate 21 is provided on an upper portion of the fragrance cartridge 20, and the pair of electrodes 11 and 12 are provided on a lower portion of the perfume diffuser 10. When the fragrance cartridge 20 is mounted on the perfume diffuser 10, the pair of electrodes 11 and 12 are in contact with each other and electrically connected. At this time, the resistance plate 21 provided in each fragrance cartridge 20 may have different resistances.

Alternatively, the fragrance cartridge 20 may be provided in various types. For example, there are various types of the fragrance cartridge 20 in which the liquid perfumes of different fragrances are stored, and a user may mount the fragrance cartridge 20 containing the liquid perfume of the desired fragrance to the perfume diffuser 10. In this case, the resistance plate 21 provided in each fragrance cartridge 20 in which liquid perfume of different fragrances are stored may have different resistances.

Figure 4:
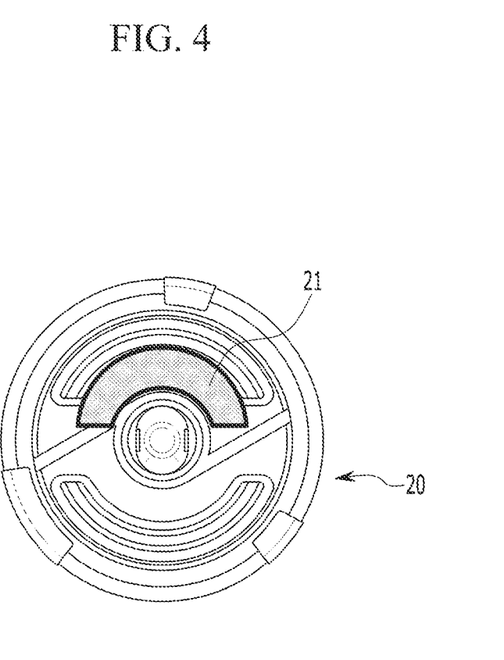
FIG. 4 is a drawing illustrating an upper part of a fragrance cartridge according to an exemplary embodiment of the present disclosure.

The resistance plate 21 provided in the fragrance cartridge 20 may be formed in arc shape (refer to FIGS. 4 and 5), and the resistance of each resistance plate 21 may be changed by forming the width of the resistance plate 21 differently.

Figure 5:
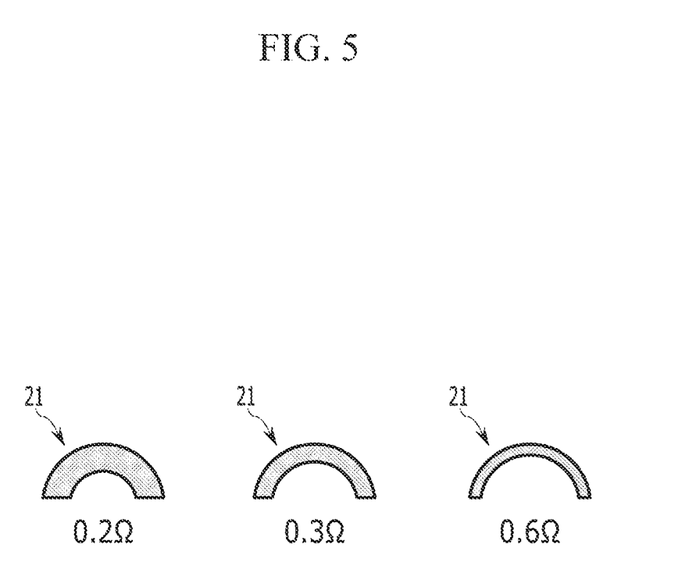
FIG. 5 is a drawing illustrating resistance plates of a fragrance cartridge according to an exemplary embodiment of the present disclosure.

Referring to FIG. 5, when three fragrance cartridges 20 are mounted in the perfume diffuser 10, by adjusting the width of each fragrance cartridge 20 arc, it is possible to design the resistance plate 21 of the first fragrance cartridge 20 having 0.2 Ohms, the resistance plate 21 of the second fragrance cartridge 20 having 0.3 Ohms, and the resistance plate 21 of the third fragrance cartridge 20 having 0.4 Ohms.

The controller 30 may identify the types of the fragrance cartridge 20 based on a size of current flowing through the pair of electrodes 11 and 12 and the resistance plate 21. Additionally, the controller 30 may calculate a usage amount of the fragrance cartridge 20 based on an intensity and a use time of the perfume diffuser 10.

For this, the control unit 30 may be provided as at least one processor operating by a predetermined program, and the predetermined program performing each step of a method of controlling the vehicle provided with the perfume diffuser according to an exemplary embodiment of the present disclosure Meanwhile, the vehicle provided with the perfume diffuser according to an exemplary embodiment of the present disclosure may further include a display device 40 that displays the type of the fragrance cartridge 20 and/or the usage amount of the fragrance cartridge 20.

The display device 40 may be a cluster or AVN (audio video navigation) mounted in the vehicle. The display device 40 may function as an input module that receives driver's instructions and/or an output module that provides vehicle information (e.g., types of fragrance cartridge 20 and usage amount of fragrance cartridge 20).

Hereinafter, an operation of the vehicle provided with the perfume diffuser according to an exemplary embodiment of the present disclosure will be described in detail with reference to accompanying drawings.

Figure 6:
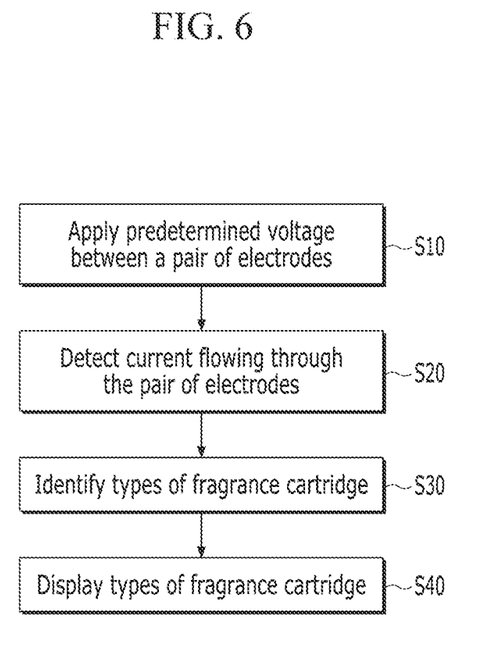
FIG. 6 and FIG. 7 are flowcharts illustrating a method of controlling a perfume diffuser according to an exemplary embodiment of the present disclosure.
Figure 7:
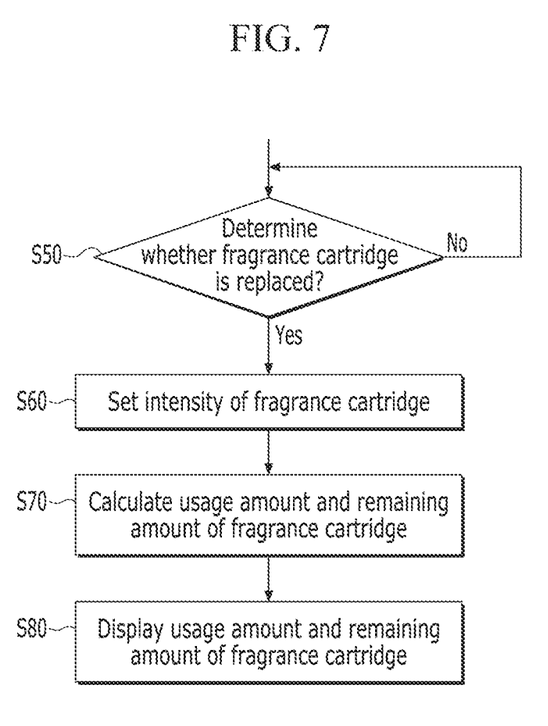

FIG. 6 and FIG. 7 are flowcharts illustrating a method of controlling a perfume diffuser according to an exemplary embodiment of the present disclosure.

As shown in FIG. 6, the controller 30 applies a predetermined voltage between the pair of electrodes 11 and 12 of the perfume diffuser 10 through a battery at S10, and detects a size of a current flowing through the pair of electrodes 11 and 12 of the perfume diffuser 10 and the resistance plate 21 of the fragrance cartridge 20 at S20. The controller 30 identifies the types of the fragrance cartridge 20 mounted on the perfume diffuser 10 based on the size of current flowing through the pair of electrodes 11 and 12 and the resistance plate 21 at 530.

Since the resistance plate 21 of each fragrance cartridge 20 has a different resistance, the size of current flowing through the pair of electrodes 11 and 12 and the resistance plate 21 depends on the resistance of the resistance plate 21. In detail, according to Ohm's Law, when the same voltage is applied to between the pair of electrodes 11 and 12, the size of current flowing through the pair of electrodes 11 and 12 and the resistance plate 21 varies as the resistance of the resistance plate 21 varies. Through this method, it is possible to identify the types of the fragrance cartridge 20 mounted on the perfume diffuser 10.

The resistance of the resistance plate 21 of the fragrance cartridge 20, and the size of current flowing through the pair of electrodes 11 and 12 of the perfume diffuser 10 and the resistance plate 21 are pre-stored in the controller 30 in the form of a map table, and the controller 30 identifies the types of the fragrance cartridge 20 based on the size of current flowing through the pair of electrodes 11 and 12 and the resistance plate 21.

For example, the controller 30 may determine that a type "A" of the fragrance cartridge 20 (e.g., fragrance cartridge 20 stored in which type "A" liquid perfume is stored) is mounted when the size of current flowing through the pair of electrodes 11 and 12 and the resistance plate 21 is 10 mA, the controller 30 may determine that a type "B" of the fragrance cartridge 20 (e.g., fragrance cartridge 20 stored in which type "B" liquid perfume is stored) is mounted when the size of current flowing through the pair of electrodes 11 and 12 and the resistance plate 21 is 20 mA, and the controller 30 may determine that a type "C" of the fragrance cartridge 20 (e.g., fragrance cartridge 20 stored in which type "C" liquid perfume is stored) is mounted when the size of current flowing through the pair of electrodes 11 and 12 and the resistance plate 21 is 30 mA. If current does not flow through the pair of electrodes 11 and 12 and the resistance plate 21, the controller 30 may determine that the fragrance cartridge 20 is not mounted on the perfume diffuser 10.

The controller 30 may provide the types of the fragrance cartridge 20 mounted on the perfume diffuser 10 to the driver through the display device at S40.

Referring to FIG. 7, the controller 30 determines that a new fragrance cartridge 20 is mounted at S50. That is, the controller 30 determines whether the fragrance cartridge 20 has been replaced.

When the driver inputs that the new fragrance cartridge 20 is mounted through the display device 40, the controller 30 determines that the new fragrance cartridge 20 is mounted. When the new fragrance cartridge 20 is mounted, a remaining amount of the fragrance cartridge 20 may be set to 100%.

The user (or driver) may set an operation intensity of the perfume diffuser 10 through the display device 40 at S60. For example, the operation intensity of the perfume diffuser 10 may be divided into three stage of 'strong', 'medium', and 'weak', and the user may set the operation intensity of the perfume diffuser 10 through the display device 40. The operation intensity of the perfume diffuser 10 may be adjusted through the size of current applied to the vibration plate 13.

When the fragrance cartridge 20 is mounted on the perfume diffuser 10, the controller 30 calculates the usage amount of the fragrance cartridge 20 based on a consumption flow rate of the liquid perfume according to the operation intensity of the perfume diffuser 10 set by the user and a use time of the perfume diffuser 10 at S70.

For example, the usage amount of the fragrance cartridge 20 mounted on the perfume diffuser 10 may be calculated from following Equation 1:

$$\text{Equation 1:} L_{consumed} = L_{flow} * T$$

In the Equation 1, Lconsumed denotes the usage amount (liter) of the fragrance cartridge 20, Lflow denotes the consumption flow rate (liter/min) of the liquid perfume according to the operation intensity, and T denotes the use time of the perfume diffuser 10.

The controller 30 continuously calculates the usage amount of the fragrance cartridge 20 by using the equation 1, and displays the usage amount of the fragrance cartridge 20 on the display device 40.

The controller 30 may display the remaining amount of the fragrance cartridge 20 along with the usage amount of the fragrance cartridge 20 through the display device 40.

The remaining amount of the fragrance cartridge 20 may be calculated from following Equation 2:

$$\text{Equation 2:} L_{remained} = (L_{predetermined} - L_{consumed})/100$$

In the Equation 2, Lremained denotes the remaining amount (%) of the fragrance cartridge 20, Lpredetermined denotes an initial amount (liter) of the fragrance cartridge 20 when the new fragrance cartridge 20 is mounted, and Lconsumed denotes the usage amount (liter) of the fragrance cartridge 20.

The controller 30 may continuously calculate the remaining amount of the fragrance cartridge 20 by using the equation 2, and displays the remaining amount of the fragrance cartridge 20 on the display device 40.

When the usage amount of the fragrance cartridge 20 reaches a predetermined amount or the remaining amount of the fragrance cartridge 20 reaches a limit of use, the controller 30 may inform the user to replace the fragrance cartridge 2 through the display device 40 at S80).

As described above, according to an exemplary embodiment of the present disclosure, it is possible to easily identify the types of the fragrance cartridge 20 mounted on the perfume diffuser 10 of the vehicle through a simple structure, and reduce manufacturing cost of the vehicle by removing additional dedicated controller for controlling the perfume diffuser 10.

Further, by providing the driver with the usage amount of the remaining amount of the fragrance cartridge 20 through the display device, the user (or driver) may visually check the replacement timing of the fragrance cartridge 20.

While this disclosure has been described in connection with what is presently considered to be practical exemplary embodiments, it is to be understood that the disclosure is not limited to the disclosed embodiments. On the contrary, it is intended to cover various modifications and equivalent arrangements included within the spirit and scope of the appended claims.

What is claimed is:
1. A vehicle comprising:
a perfume diffuser including a pair of electrodes;
at least one fragrance cartridge including a resistance plate electrically connected to the pair of electrodes; and
a controller configured to identify a type of the fragrance cartridge based on a size of a current flowing through the pair of electrodes and the resistance plate.
2. The vehicle of claim 1, wherein the controller is configured to calculate a usage amount of the fragrance cartridge based on an operation intensity of the perfume diffuser and a use time of the perfume diffuser.

3. The vehicle of claim 1, further comprising a plurality of fragrance cartridges, wherein each fragrance cartridge includes a resistance plate, and wherein each of the resistance plates has a different resistance.

4. The vehicle of claim 1, wherein the controller is configured to apply a predetermined voltage between the perfume diffuser and the pair of electrodes, to detect the size of the current flowing through the pair of electrodes and the resistance plate, and to identify the type of the fragrance cartridge.

5. The vehicle of claim 4, wherein the controller is configured to output the type of the fragrance cartridge through a display device.

6. The vehicle of claim 2, wherein the controller is configured to output the usage amount of the fragrance cartridge through a display device.

7. The vehicle of claim 2, wherein the controller is configured to inform a user to replace the fragrance cartridge through a display device when the usage amount of the fragrance cartridge reaches a predetermined amount.

\* \* \* \* \*